(12) United States Patent
Bretschneider et al.

(10) Patent No.: US 8,826,395 B2
(45) Date of Patent: Sep. 2, 2014

(54) METHOD OF IMPROVING ONLINE CREDENTIALS

(75) Inventors: Ken Bretschneider, Lindon, UT (US); Paul Tiemann, Lindon, UT (US); Dan Egbert, Orem, UT (US)

(73) Assignee: DigiCert, Inc., Lindon, UT (US)

( * ) Notice: Subject to any disclaimer, the term of this patent is extended or adjusted under 35 U.S.C. 154(b) by 0 days.

(21) Appl. No.: 13/429,092

(22) Filed: Mar. 23, 2012

(65) Prior Publication Data

US 2012/0324551 A1 Dec. 20, 2012

Related U.S. Application Data

(60) Provisional application No. 61/498,712, filed on Jun. 20, 2011.

(51) Int. Cl.
*G06F 21/00* (2013.01)
(52) U.S. Cl.
USPC .............................................................. 726/5
(58) Field of Classification Search
USPC .............................................................. 726/5
See application file for complete search history.

(56) References Cited

U.S. PATENT DOCUMENTS

| 2004/0064335 | A1* | 4/2004 | Yang .................................. 705/1 |
| 2005/0160286 | A1* | 7/2005 | Currie et al. ................... 713/200 |
| 2010/0275012 | A1* | 10/2010 | Kido et al. ...................... 713/156 |
| 2010/0287180 | A1* | 11/2010 | Kim et al. ....................... 707/769 |
| 2010/0313248 | A1* | 12/2010 | Krivosheev et al. ............... 726/5 |
| 2011/0055911 | A1* | 3/2011 | Adelman et al. ................... 726/7 |
| 2011/0126292 | A1* | 5/2011 | Ferg et al. ......................... 726/26 |
| 2012/0047581 | A1* | 2/2012 | Banerjee et al. ................. 726/24 |
| 2012/0278876 | A1* | 11/2012 | McDonald ......................... 726/9 |
| 2013/0055403 | A1* | 2/2013 | Pennington et al. ............. 726/25 |

* cited by examiner

*Primary Examiner* — Matthew Smithers
(74) *Attorney, Agent, or Firm* — Brinks Gilson & Lione; John C. Bacoch

(57) ABSTRACT

The invention comprises a method of providing additional assurance regarding a websites authenticity, The assurance is provided by using a credential that contains an image of the website operator or the website operator's business operations. The assurance is also provided by scanning the website associated with the credential for changes and alerting the website operator or a website visitor of the changes. The invention includes a method of ensuring the proper operation of the credential and a method of protecting the credential from mis-issuance.

39 Claims, 5 Drawing Sheets

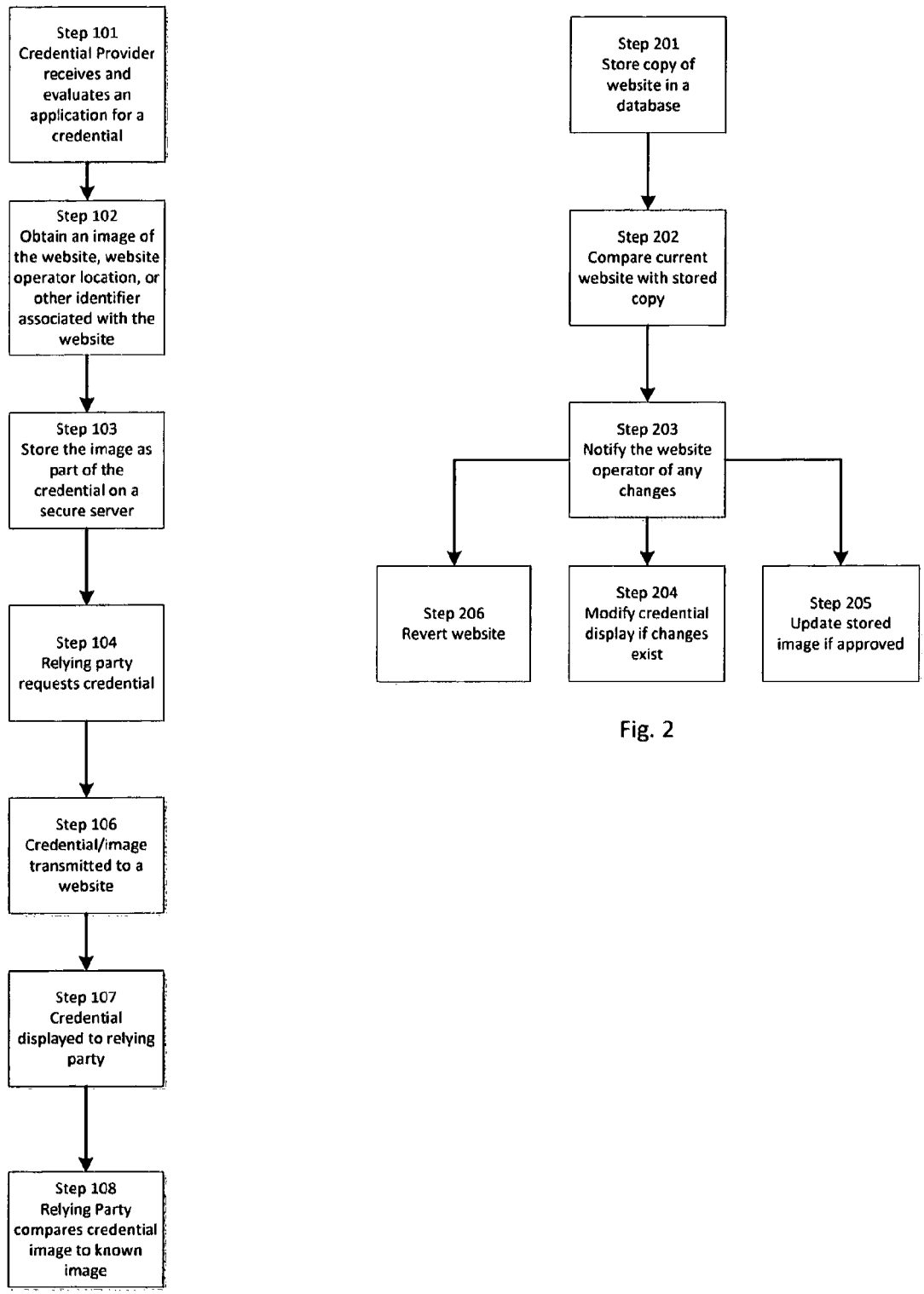

METHOD OF IMPROVING ONLINE CREDENTIALS

CROSS-REFERENCE TO RELATED APPLICATION

This application claims the benefit of provisional application Ser. No. 61/498,712, filed on Jun. 20, 2011, which is incorporated entirely herein by reference.

BACKGROUND

Websites often use trust logos and security seals to provide trust assurance information to visitors and customers. The trust seal of a well known brand can greatly increase the online revenue of a website.

Online credentials are often used to convey messages to visitors. In the past, this information comprised of a text message about the identity of a website operator. The information is generally presented after the user interacts with the trust mark.

However, a text message is easily replicated by a malicious actor and lacks a direct connection to the website operator. In addition, waiting until a user interacts with the credential risks the user being unaware of the credential in the first place, negating the potential trust value. Thus, there is a need to improve the message provided through online credentials.

Because these credentials are invaluable in establishing online trust, they are often the subject of theft and hacking. The risk of compromise to a credential provider is greater than other service providers because the compromise of the credential can result in a loss of trust in the entire credential. Without adequate protection, a credential loses its value. Therefore, there is a need to ensure that only authorized users can use the credential.

Finally, a credential that is not installed properly can result in relying party error, vulnerabilities occurring on the associated website, or a non-functioning credential. A non-functioning credential or credential that creates website problems is worse than not having a credential, resulting in a loss of trust and possibly a theft of information. Therefore, there is a need for a method that ensures the credential is installed and operating correctly.

SUMMARY OF THE INVENTION

The current invention is a method of providing security information by providing the relying party and image of an individual or organization responsible for the credential.

The current invention also teaches a method of ensuring the proper issuance of credential by requiring a temporary password be entered prior to the credential's issuance. Additional temporary passwords can be required for websites that are evaluated as higher risk.

The current invention also teaches a method of installing the security device by issuing the credential and running a variety of tests to evaluate the credential's performance.

BRIEF DESCRIPTION OF THE FIGURES

FIG. 1 is a flowchart showing an embodiment of the invention.

FIG. 2 is a flowchart showing an embodiment of the invention where a stored copy of a website is used to evaluate the risk of changes.

DESCRIPTION OF INVENTION

Figure 5:
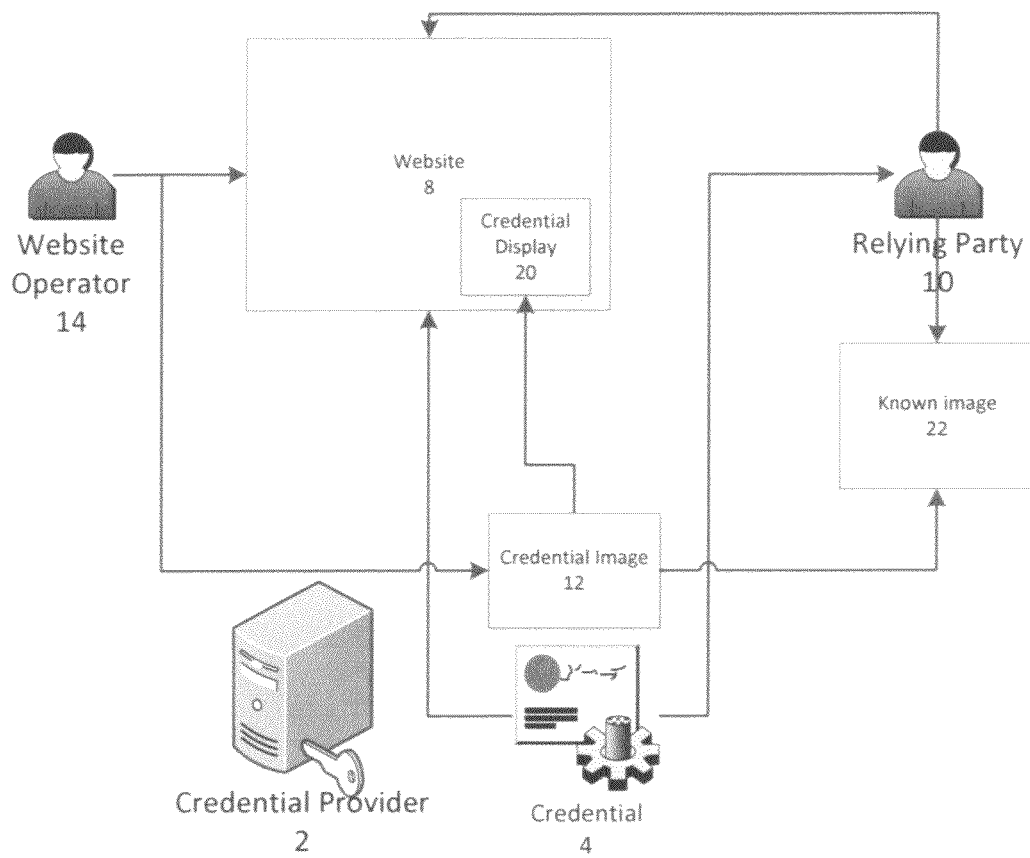
FIG. 5 is a diagram of the first embodiment of the invention.

The first embodiment of the invention, shown in FIG. 1 and FIG. 5, teaches a method of providing an improved credential to website visitors. The credential includes a report of the snapshot of the website, an image of the website operator staff (such as the IT person responsible for the website or an executive of the entity operating the website) or the website operator's location or office (such as a reception area or an external view of the building) (a "credential image"). A website operator is any entity with control over the website, including the IT administrators, a hosting company, the website owner, or an agent of an entity. A relying party is any entity or device that will access or rely on the credential, including browsers, end-users, other servers, and authentication devices. A credential provider is any device or entity that provides certification for the website or website operator, including certificate authorities, scanning service providers, trustmark providers, and network security consultants. In all cases, the invention contemplates that an agent could operate on behalf of the credential provider to perform the services described herein.

A credential 4 can be a digital certificate, a trust mark, a website seal, or any other known mechanisms for conveying trust to a relying party. A relying party is an entity or device that visits a website associated with the credential, such as a device, a computer, or an end-user. The credential 4 and credential image 12 can be the same set of data (one single credential) or separate sets of data (multiple credentials) and can be stored and transmitted as s ingle unit or as separate objects.

In step 101 of FIG. 1, the credential provider 2 receives an application for a credential 4. The credential provider 2 evaluates the application in accordance with its standard procedures, such as verifying the applicant's name and control over the website where the credential will be displayed. In step 102, the credential provider 2 obtains the credential image 12 by having a representative of the credential provider 2 visit the website operator's location, copying an online image via the Internet (such as through an online map service), or by having the website operator 14 submit an image to the service provider. An agent of the credential provider can obtain the credential image as part of the credential provider's verification of the operator's operations or identity ("verification information"). This verification information can be used to authenticate the website and/or website operator and provide a separate credential, such as an TLS/SSL certificate.

In step 103, the credential provider 2 stores the credential image 12 in a database. The image can be stored in any known format. The database can be of any format but should be secured from intrusion.

In Step 104, a relying party 10 visits a website 8 associated with the credential 4. Code embedded on the website requests that the credential provider 2 transmit a copy of the credential 4. Optionally, the credential provider may verify the authenticity of the request by checking the URL of the request or requiring a signed request file. If the request is authorized or not verified, the credentials provider 2 returns the credential 4 and/or the credential image 12. The website 8 displays the returned credential 4 or credential image 12 in the designated credential display area 20. The designated display area can be set by the credential provider or by the website operator.

The request to display the credential can occur using any known way of requesting information from a credential. For example, a website visitor could interact with a trust mark displayed on the site, which instructs the website to obtain the credential information. Alternatively, a device could request the credential when the website loads or immediately when a relying party accesses the website.

To add additional security, in Step 108, a relying party 10 may compare the displayed credential image 12 with an image selected or already known to the relying party (known image) 22. A known image is any image that will confirm the credential image as being correct. For example, if the known image is the display of the website and the credential image is copy of the website, the relying party or a plugin can compare the two to make sure they are identical or substantially similar. Another example is where the relying party obtains a copy of the security credential from the credential provider. The relying party then compares the copy provided from the credential provider with the security credential displayed on the website to verify that they are identical or substantially similar. The known image can be obtained or provided to the relying party from a third party source (such as the credential provider) or be stored on a secure server of the relying party. If the known image and the credential image are identical, then the relying party can trust the authenticity of the website. The comparison can be made automatically by code or by an actual person comparing the two images.

In addition to a credential image 12, the credential 4 can include or display information about the threat of malware or vulnerabilities present or associated with a website 8 or the website operator's 14 operations. The credential provider 2 obtains this information by performing a vulnerability or malware scan 34 either prior to the credential being displayed or when the credential is requested.

If the scan 34 detects a vulnerability or malware, the website operator 14 is required to correct the problem prior to displaying the credential image 12. The credential provider 2 may require subsequent to determine whether a new vulnerability or malware exists. If malware or a vulnerability is detected, the website operator is provided a grace period in order to correct the problem.

Figure 6:
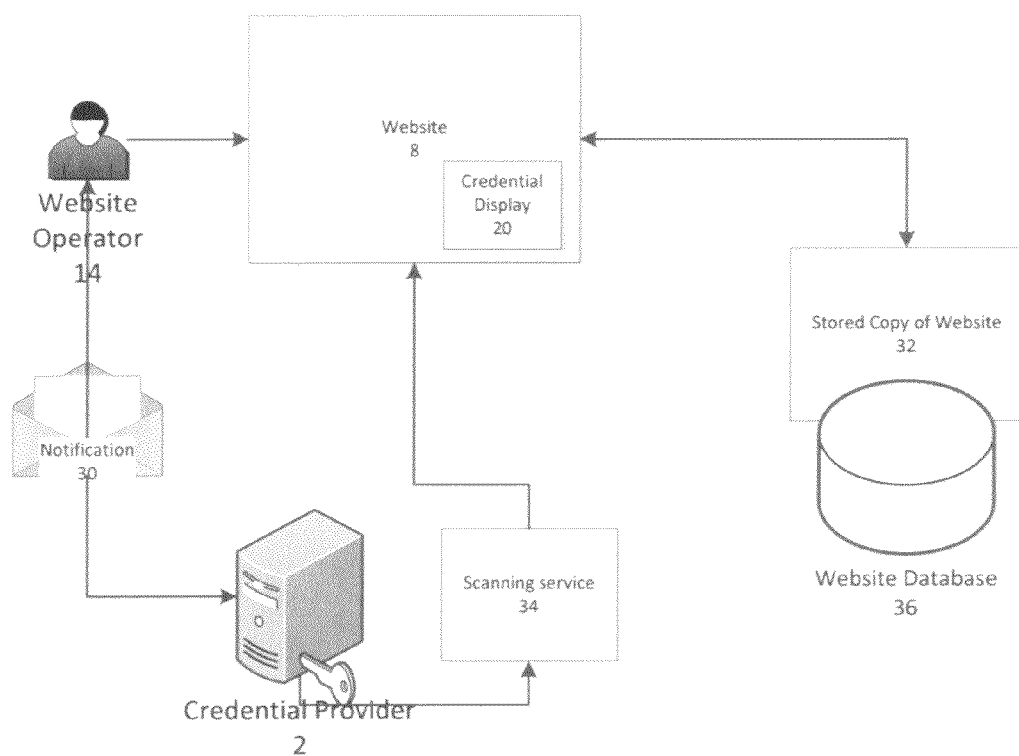
FIG. 6 is a diagram of an alternate embodiment of the invention that uses a scanning service and stored copy of the website.
Figure 7:
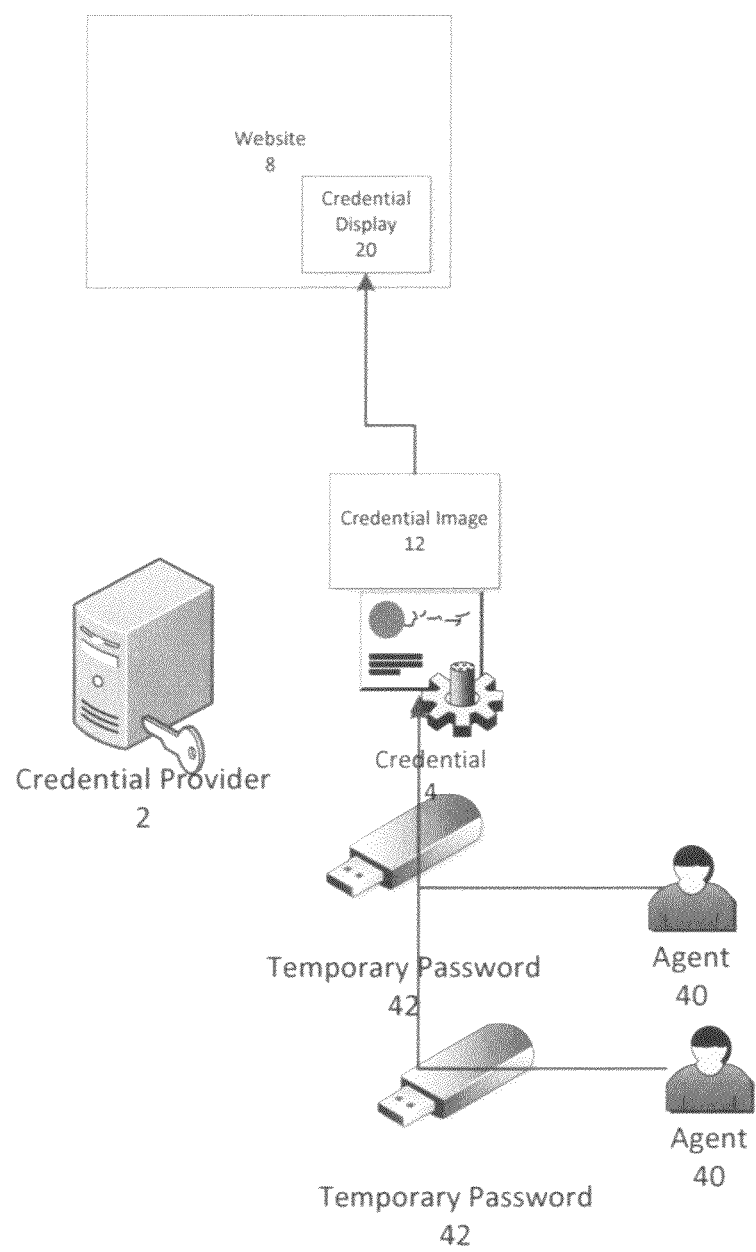
FIG. 7 is a diagram of an alternate embodiment of the where agents using temporary passwords must approve the issuance of a credential.

As shown in FIG. 2 and FIG. 6, the security provider 2 may require a website 8 authorized to display the credential 4 to undergo periodic scans 34 that detect changes to the website 8. In step 201, a copy or image of the website 8 or a text copy of the website is saved to a database 36. A text copy could be the scripted pages of a website or the existing text on a website. In step 202, the scanning service 34 accesses the website 8 again at a later day or time and compares the current website 8 with the saved copy of the website 32. The comparison can be performed using a bit image comparison tool, by comparing the text of the website with the text stored in the database 36, or by comparing the scripted pages of the stored and current website. The scanning service 34 can compare the entire website or just a select portion of the website. Using only a portion of the website allows a website operator 14 to exclude news feeds and other frequently changing content from the comparison.

If a change is detected, then in step 204, a notification 30 is sent to the website operator, alerting them of the website change. The notification can be sent automatically and can be any known method of communication, such as an automated email or telephone call. The notification can tell or show the website changes that occurred since the last scan or, for security reasons, only inform the website operator 14 that a website change was detected. The notification 30 may contain a confirmation link or other instructions that the website operator may follow to confirm that the website changes were authorized.

In step 205, if the website changes are confirmed as authorized, the credential provider stores the modified website in the database 36 as a new stored copy of the website. When the next scan occurs, the scanning service 34 compares the current website with the stored copy of the website instead of previously stored versions. The scanning service 34 can store and compare multiple copies of the website in case the website operator 14 decides to revert to a previous version. If the current website 8 matches any of the stored copies 32, then the scanning service 34 automatically approves the website changes.

In step 206, if the website changes are not approved by the website operator, then the credential provider 2 can upload the stored copy of the website 32 and restore the original website contents. This restoration can occur at the request of the website operator 14 who follows a link in the notification 30 or automatically. A website operator 14 can also request restoration an account maintained with the credential provider 2.

If a website change is detected, the credential provider can modify the credential 4 to reflect the website change. For example, if the credential image 12 is a snapshot of the website, the credential provider 4 can replace the existing credential image 12 with an updated snapshot of the website. If unauthorized website modifications are detected, the credential provider 2 can use the credential display 20 to display a warning, such as a red border, image, or text, that alerts relying parties 10 about the change. If the website modifications are authorized, the credential 4 can inform the relying parties 10 that of date the website last changed and that the changes were authorized. Authorized alerts might include displaying a green border or displaying the date the website information was last approved.

In an alternate version, steps 205-206, updating the image and sending alerts, will only occur if the changes exceed a set threshold. For example, a notice would not be sent to the website operator if only a small percent of text on the site has changed or if only minor changes to the layout of the website were made.

The credential provider can also send customized notices depending on the type of change. For example, if spelling and grammar errors are detected on the website, the notification 30 may include a recommendation that the website operator 14 correct those errors. Similarly, if the credential provider 2 detects that a website change introduced vulnerability into the website, then the credential provider can send a customized notice about the vulnerability, and possibly recommend a remediation plan, while displaying a warning to relying parties 10.

The credential provider 2 can also provide notice about changes directly through the credential 4 (or credential image 12). For example, a credential might display a red warning symbol on the credential display area 20 if vulnerabilities are detected on a website 8 and provide further information about the warning when the user interacts with credential.

Figures 3, 4:
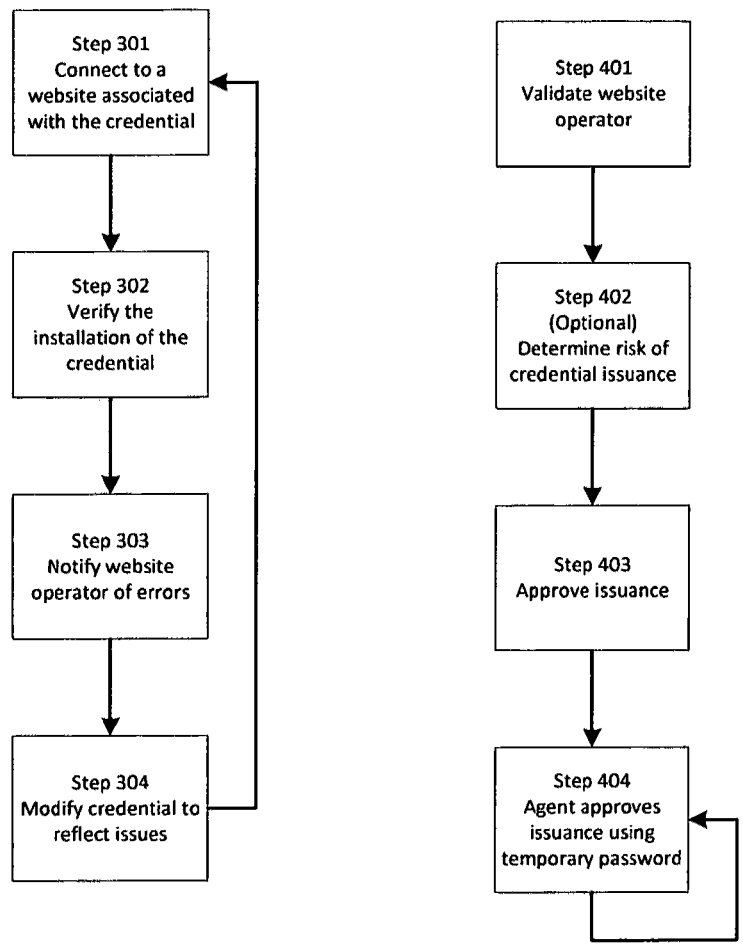
FIG. 3 is a flowchart showing an embodiment of the invention where installation of the credential is verified.
FIG. 4 is a flowchart showing an embodiment of the invention where a credential to a higher risk website requires approval from agents using temporary passwords.

To ensure that the credential 4 is installed correctly, in Step 301 of FIG. 3, the credential provider 2 accesses the website 8 over the Internet. In step 302, the credential provider 4 checks the installation of the credential 2. The tests ran depend on the type of credential. For trust marks, a server access the website and verifies that the credential is displayed correctly.

For SSL Certificates, the credential provider 2 establishes a series of SSL connections to determine whether the correct intermediates are being delivered from the server, to determine whether the correct SSL cipher suites are supported, to test the SSL protocols, to test renegotiation support, and to test strict transport security. Other tests may include name matching, checking the certificate validity period, and examining the key pair associated with the certificate for vulnerabilities. If any issues are determined then, in step 303, a notification is sent to the website operator. The notification can contain explicit instructions regarding the installation problems associated with the website, including how to fix any detected errors. The notice can also include remediation support and a deadline for when any detected errors must be resolved.

If errors are not resolved, then the credential provider 2 may modify the credential 4 in order to alert relying parties 10 about possible issues with the credential's installation. The credential provider may configure the credential to display contact information if the relying party has questions or requires assistance or if the credential is improperly installed.

In an alternate embodiment, shown in FIG. 4, the credential provider 2 receives a request for a credential 4. Prior to issuing the credential, 4, the credential provider evaluates the risk involved in issuing the credential. Factors used may include the number of hits a website receives, previous complaints about the applicant, the number of transactions conducted over a website, the hardware and software supporting the website, third party reviews and evaluations of the website, the content and nature of the website, and/or the presence of any vulnerabilities or malware associated with the website.

If the credential provider 2 decides to issue the credential 4, an agent 40 (a third party or additional employee of the credential provider) must approve the issuance using a temporary password 42. The agent 40 enters the temporary password 42 into an account linked to the credential issuance system or using a token to submit the password, such as through a USB key. The temporary password is created by the token and provided to the agent.

Higher risk applicants may require additional agents using additional temporary passwords. Whether or not an applicant is considered high risk is determined by the credential provider when evaluating the credential application.

What is claimed is:

1. A method of providing trust information about a website operator, the method executable by a processor and comprising:
   a. obtaining, using the processor, an image associated with the website comprising a screen capture of a portion of the website,
   b. creating, using the processor, a credential associated with a website that contains the image associated with the website, and
   c. displaying, using the processor, the image to a website visitor through a browser during an interaction with the website by the website visitor.

2. A method according to claim 1, where the image further comprises a photograph of an entity responsible for content of the website.

3. A method according to claim 2, where the photograph is uploaded to a credential provider system by an agent thereof who obtained the image while visiting a business location of the responsible entity.

4. A method according to claim 3, where the agent verifies an identity of the responsible entity and qualifications for the credential while visiting the business location.

5. A method according to claim 1, where the image comprises a first image and is compared to a second image that has the same association with the website as the first image.

6. A method according to claim 5, further comprising:
   displaying a first credential on the website to the website visitor when the first image matches the second; and
   displaying a second credential on the website different than the first credential when the first image does not match the second image.

7. A method of providing security notifications related to the modification of a website, the method executable by at least one processor and comprising:
   a. storing, using the at least one processor, a copy of the website in a database,
   b. detecting, using the at least one processor, whether changes are made to the website by electronically comparing contents of the website with the stored copy of the website,
   c. providing to a website operator, using the at least one processor, automated notification of changes to the website detected during the electronic comparison,
   d. confirming the changes as being authorized, and
   e. displaying, using the at least one processor, a credential on the website responsive to confirming the changes as being authorized.

8. A method according to claim 7 where the notification is an automated phone call to a telephone number associated with the website operator.

9. A method according to claim 7 where the notification includes a risk rating that is calculated based on a risk profile associated with the changes made to the website.

10. A method according to claim 7 where the notification is sent when a change occurs in a specific area of the website.

11. A method according to claim 7 where the notification includes a list of the changes made to the website.

12. A method according to claim 7 where the notification includes a list of detected vulnerabilities associated with the detected change to the website and instructions on how to remediate the vulnerabilities.

13. A method according to claim 7 where providing the automated notification occurs when the changes to the website exceed a set threshold amount of change.

14. A method according to claim 7 further comprising storing a copy of the website in a database after confirming the changes as authorized.

15. A method according to claim 7 where multiple stored copies of the website are compared to the website to track a location on the website where the changes occurred.

16. A method according to claim 7 further comprising, when a website change is detected, replacing the website with the copy of the website stored in the database.

17. A method according to claim 7 further comprising modifying the credential when a change to the website is detected.

18. A method according to claim 17 where the modifying the credential happens when the changes to the website exceed a set threshold amount of change.

19. A method of testing the installation of a secure sockets layer (SSL) credential, the method executable by a processor and comprising:
   a. connecting, using the processor, to a server via an SSL connection,
   b. testing, using the processor, the configuration of an SSL credential installed on the server, comprising—checking a series of SSL connections to determine whether correct intermediate certificates are provided during the series of SSL connections with the server;

c. displaying, using the processor, a visual indicator that the correct intermediate certificates were provided during the series of SSL connections; and d. sending a notification of the testing to a website operator.

20. A method according to claim 19, where the notification includes instructions on certificate installation problems associated with the website, and how to fix detected errors.

21. A method according to claim 19, further comprising determining whether correct SSL cipher suites are supported.

22. A method of issuing an online credential, the method executable by a processor and comprising:

a. verifying, using the processor, qualifications of an applicant for an online credential, b. determining, using the processor, a risk associated with the applicant based on a website associated with the online credential, c. displaying on the website, when the risk meets a set threshold, a temporary password for insertion into an authentication system before the credential will issue; and d. displaying, using the processor, the credential on the website responsive to receipt of authentication from the authentication system comparing the temporary password with a stored temporary password.

23. A method according to claim 22 further comprising:
requiring authentication through the authentication system of multiple temporary passwords before issuing a credential for display on the website.

24. A credential issuing system comprised of:

a credential provider system having a processor configured to provide a credential containing an image that is associated with a website;

a location on the website where the image is displayed after the credential receives an interaction; and an issuing system in communication with the credential provider system and configured to authenticate at least one temporary password received from the credential provider system prior to issuing the online credential for display in the location on the website.

25. A system according to claim 24 further comprising a notification system configured to provide a notice when the image associated with the website is different than a previous version of the image.

26. A system according to claim 24 further comprising a scanning service configured to detect changes to a website and database hosted by a service provider of the website.

27. A system according to claim 24 where the image comprises a screen capture of the website or a photograph of a business location of an entity responsible for content of the website.

28. A system comprising:

a computing device having a processor and memory and configured to provide trust information regarding a website operator in conjunction with delivery of a website, where the processor is configured to:

retrieve an image associated with the website, the image comprising a photograph of a business location of an entity responsible for content of the website;

upload the photograph to a credential provider system;

receive from the credential provider system a credential associated with the website, where the credential includes the photograph; and deliver, to a browser of a computing device of a website visitor, the credential for display on the website.

29. The system according to claim 28, where the processor is further configured to deliver the credential to a specific location on the website.

30. A system according to claim 28, where the processor is further configured to verify an identity of the entity and qualifications of the credential based on content of the photograph and accompanying information related to the business location.

31. A system according to claim 28, where the photograph comprises a first photograph, and the processor is further configured to compare the first photograph to a second photograph that has the same association with the website as the first photograph.

32. A system according to claim 31, where the processor is further configured to:

display a first credential on the website to the website visitor when the first photograph matches the second photograph; and display a second credential on the website different than the first credential when the first photograph does not match the second photograph.

33. A system comprising:

a computing device having a processor and memory and configured to provide security notifications related to modification of a website, where the processor is configured to:

store a copy of the website in a database;

detect whether changes are made to the website by electronically comparing contents of the website with the stored copy of the website;

confirm the changes as being authorized; and display a credential on the website responsive to confirming the changes as being authorized.

34. The system according to claim 33, where the processor is further configured to provide to a website operator automated notification of changes to the website detected during the electronic comparison.

35. The system according to claim 34, where the notification is an automated phone call to a telephone number associated with the website operator.

36. The system according to claim 33, where the processor is further configured to store a copy of the website in a database after confirming the changes as authorized.

37. The system according to claim 33, where the processor is further configured to modify the credential when a change to the website is detected.

38. The system according to claim 37, where the credential is a snapshot of the website.

39. The system according to claim 37, where modifying the credential comprises altering a color, an image or text of the credential to communicate to relying parties of the change to the website, and whether the change is authorized.

* * * * *

UNITED STATES PATENT AND TRADEMARK OFFICE
CERTIFICATE OF CORRECTION

| | | |
|---|---|---|
| PATENT NO. | : 8,826,395 B2 | Page 1 of 1 |
| APPLICATION NO. | : 13/429092 | |
| DATED | : September 2, 2014 | |
| INVENTOR(S) | : Ken Bretschneider et al. | |

It is certified that error appears in the above-identified patent and that said Letters Patent is hereby corrected as shown below:

<u>In the Claims</u>

In column 6, claim 6, line 9, after "image matches" replace "the second; and" with --the second image; and--.

Signed and Sealed this
Fifth Day of May, 2015

Michelle K. Lee
*Director of the United States Patent and Trademark Office*